(12) United States Patent  
Gilles

(10) Patent No.: US 6,415,856 B1  
(45) Date of Patent: Jul. 9, 2002

(54) HEATING/AIR-CONDITIONING DEVICE FOR REDUCED SIZE FOR A MOTOR VEHICLE

(75) Inventor: Elliot Gilles, Courcouronnes (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/464,045

(22) Filed: Dec. 15, 1999

(30) Foreign Application Priority Data

Dec. 21, 1998 (FR) ............................................. 98 16124

(51) Int. Cl.$^7$ ................................................. B60H 1/00
(52) U.S. Cl. ........................... 165/203; 165/42; 454/69; 454/160
(58) Field of Search .............................. 165/41, 42, 43, 165/201, 202, 203, 204; 454/69, 141, 152, 155, 156, 159, 160, 161

(56) References Cited

U.S. PATENT DOCUMENTS

| | | | | |
|---|---|---|---|---|
| 3,646,875 A | * | 3/1972 | Zenkner | 454/161 X |
| 4,907,497 A | * | 3/1990 | Danieau | 454/161 X |
| 5,042,566 A | | 8/1991 | Hildebrand | 165/42 |
| 5,305,823 A | * | 4/1994 | Elliot | 165/42 X |
| 5,478,274 A | * | 12/1995 | Danieau | 454/160 X |

FOREIGN PATENT DOCUMENTS

| | | | |
|---|---|---|---|
| DE | 90 03 512 | 9/1990 | |
| DE | 40 34 290 A1 * | 5/1992 | ............... 165/42 |
| DE | 197 53 878 | 6/1998 | |
| EP | 0 214 605 | 3/1987 | |
| FR | 2 742 383 | 6/1997 | |
| FR | 2 754 492 | 4/1998 | |
| GB | 1 065 866 | 7/1981 | |

* cited by examiner

Primary Examiner—Ljiljana Ciric  
(74) Attorney, Agent, or Firm—Morgan & Finnegan, LLP

(57) ABSTRACT

A heating/air-conditioning device suitable for housing in a vehicle instrument panel includes an evaporator, a heating radiator, an air-distribution means with first and second deflector means, and a blower. The blower sends an airflow through the evaporator and the heating radiator. The evaporator has a principal surface in a first principal plane and the heating radiator has a principal surface in a second principal plane. The evaporator is traversed by the airflow in a first direction substantially perpendicular to the first principal plane. The first deflector means then divert the airflow into a second direction substantially perpendicular to the second principal plane with part of the airflow passing through the heating radiator. The second deflector means then diverts the airflow into a direction substantially parallel to the second principal plane. The air-distribution means diffuses the airflow into a passenger compartment of the vehicle.

34 Claims, 2 Drawing Sheets

HEATING/AIR-CONDITIONING DEVICE FOR REDUCED SIZE FOR A MOTOR VEHICLE

FIELD OF THE INVENTION

The invention relates to a heating/air-conditioning device of reduced size for a motor vehicle.

BACKGROUND OF THE INVENTION

Heating/air conditioning devices are known that are suitable for being housed in a motor vehicle instrument panel and typically comprise a blower sending a flow of air through an evaporator and through a heating radiator. The airflow is then diffused into the passenger compartment of the vehicle by air-distribution means.

In a device of this type, the blower is fed either with external air taken from outside the passenger compartment of the vehicle, or with recirculated air taken from within the passenger compartment. The blower sends a flow of air through the evaporator, which is linked to a conventional air-conditioning circuit, and possibly through the heating radiator which is usually traversed by a hot fluid, namely the liquid for cooling the engine of the vehicle. The airflow thus cooled and/or heated is distributed, by virtue of the air of distribution means, between various nozzles opening into the passenger compartment.

Moreover, such a device usually comprises an air filter arranged on the path of the airflow so as to retain the impurities transported by the air, this air filter usually being arranged between the blower and the evaporator.

It has recently been proposed to group together the elements constituting the device into a space of generally rectangular shape within the instrument panel so as to obtain a saving in space and to allow standardization of manufacture.

However, this solution dictates a horizontal position for the evaporator, as well as a long circulation path for the airflow, which gives rise to losses of pressure and thermal losses.

A device of this type is described, for example, in the document EP 0 788 907.

An object of the invention is to at least partly mitigate the above-mentioned drawbacks

SUMMARY OF THE INVENTION

A heating/air-conditioning device suitable for being housed in an instrument panel of a motor vehicle and comprising a blower sending a flow of air through an evaporator and through a heating radiator, the airflow then being diffused into the passenger compartment of the vehicle by air-distribution means, The principal surface of the evaporator extends in a first principal plane and the principal surface of the heating radiator extends in a second principal plane. The evaporator is traversed by a flow of air along a first direction substantially perpendicular to the first principal plane. The airflow is then diverted by first deflector means so as to orient it along a second direction substantially perpendicular to the second principal plane, such that at least a part of the airflow passes through the heating radiator, this part then being diverted by second deflector means so as to orient it along a direction substantially parallel to the second principal plane.

By virtue of this structure, the airflow undergoes an overall right-angled diversion between passing over the evaporator and passing over the radiator. As the airflow always passes over the radiator, it is not necessary to provide an air mixing flap as usually employed to mix a cold airflow and a hot airflow, which flow gives rise to the large size of conventional devices.

The outlet from the heating radiator preferably communicates with an outlet chamber, the latter communicating directly with the air-distribution means via a distribution flap.

This direct communication thus avoids the use of the mixing flap which is usually arranged between the heating radiator and the air-distribution means.

The heating radiator is advantageously a heat exchanger of the liquid/air type suitable for being traversed by a hot fluid and fitted with a cock for adjusting the throughput of the hot fluid.

In one embodiment of the invention, the device further comprises a take-off duct which communicates, on the one side, with the first deflector means and, on the other side, with the outlet chamber. The take-off duct is under the control of an adjusting flap, in such a way that the outlet chamber is fed with a flow of air originating from the heating radiator and, if appropriate, with a flow of air originating from the evaporator.

The first deflector means advantageously comprises an angled channel.

The second deflector means advantageously comprises a partition of a casing.

The device of the invention may further comprise an electric booster radiator arranged downstream of the heating radiator in such a way that the airflow passes successively through the heating radiator and the electric booster radiator.

In one advantageous embodiment, the air-distribution means comprises at least one ventilation duct which forms a connection between the outlet chamber and at least one ventilation nozzle provided in the instrument panel.

The air-distribution means preferably further comprises at least one de-icing duct which forms a connection between the outlet chamber and at least one de-icing/de-misting nozzle.

In one advantageous embodiment, the air-distribution means comprises a lateral de-icing duct which is delimited at least in part by a hollow beam serving as reinforcement for the instrument panel and forming a connection between the outlet chamber and the lateral de-icing nozzles.

Also advantageously, the air-distribution means comprises an upper de-icing duct which communicates with the outlet chamber via a connecting duct and which communicates with nozzles for de-icing/de-misting the windscreen.

According to another advantageous characteristic, the air-distribution means comprises a lower ventilation duct which forms a connection between the outlet chamber and at least one ventilation nozzle opening out low down in the passenger compartment, in the region of the passengers' feet.

It is advantageous for the lower ventilation duct to communicate with the outlet chamber by means of the connecting duct defined above, so that this connecting duct communicates both with the upper de-icing duct and with the lower ventilation duct.

An adjusting flap is then advantageously provided at the intersection of the connecting duct, the upper de-icing duct and the lower ventilation duct in order selectively to direct a flow of air to the upper de-icing duct and/or the lower ventilation duct.

According to another characteristic of the invention, the device comprises an air-distribution flap arranged at one end of the outlet chamber and an intermediate position for the air-distribution flap is provided, in which the outlet chamber communicates with the upper de-icing duct via the connecting duct and in which the lateral de-icing duct is obstructed.

According to yet another characteristic of the invention, the upper de-icing duct and the lower ventilation duct both extend along the bulkhead which separates the engine compartment from the passenger compartment of the vehicle.

The invention also provides for one wall of the lower ventilation duct and/or one wall of the upper de-icing duct to comprise soundproofing cladding of the bulkhead which separates the engine compartment from the passenger compartment of the vehicle.

In this case, it is advantageous for the wall of the lower ventilation duct and the wall of the upper de-icing duct to be a single wall comprising the soundproofing cladding of the bulkhead.

The connecting duct may further comprise an electric booster radiator for heating the airflow discharged through the upper de-icing duct and/or through the lower ventilation duct.

Advantageously, the device includes independent heating controls for setting the heating radiator and the electric booster radiator.

According to another characteristic of the invention, the blower, the evaporator, the heating radiator and at least a part of the distribution means are included in a casing suitable for being integrated into the instrument panel.

Advantageously, this casing is intended to be placed on the same side as the driving position and above the steering column.

According to yet another characteristic of the invention, in a principal cross-section, the casing exhibits a trapezoidal shape which is elongate along a longitudinal axis substantially parallel to the steering column of the vehicle, and the ratio between the dimension of the casing along this longitudinal axis and the dimension of the casing along an axis perpendicular to this longitudinal axis is substantially greater than or equal to 1.3.

Preferably, the ratio between the dimension of the casing along the longitudinal axis and the dimension of the casing along the perpendicular axis is substantially equal to 1.6.

BRIEF DESCRIPTION OF THE DRAWINGS

In the description which follows, given solely by way of example, reference will be made to the attached drawings, in which.

DESCRIPTION OF THE PREFERRED EMBODIMENTS

Figure 1:
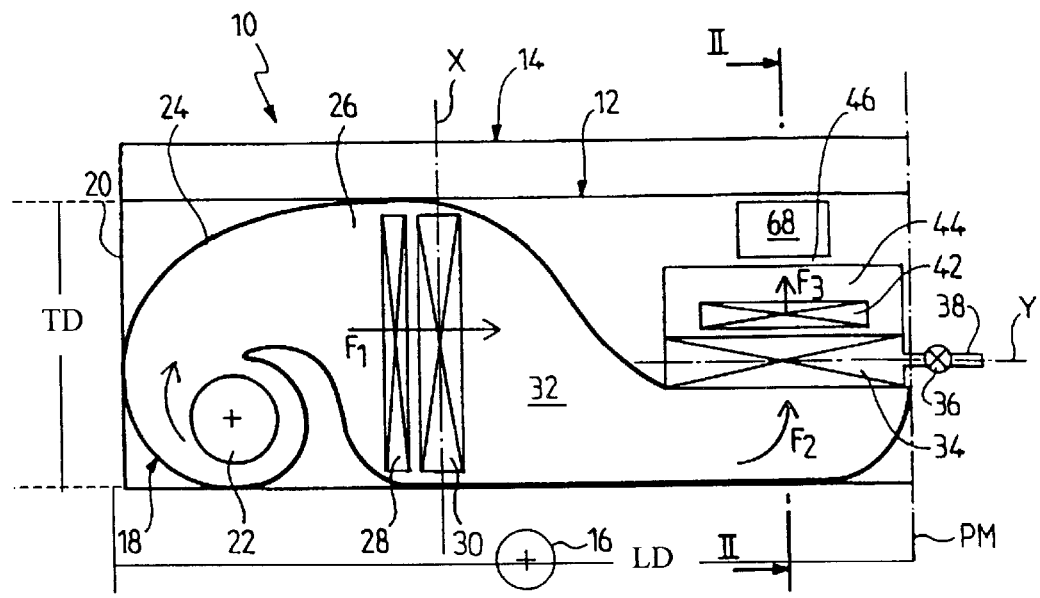
FIG. 1 is a sectional view of half of a motor vehicle instrument panel, corresponding to the driving position side, and housing a heating/air-conditioning device according to a first embodiment of the invention.

In the various figures, like reference numerals refer to like parts.

Referring first of all to FIG. 1, a device 10 for heating/air-conditioning the passenger compartment of a motor vehicle is represented. This device comprises a casing 12 of approximately rectangular shape, suitable for being incorporated into one half of the instrument panel 14 of the vehicle. The device 10 is intended to be arranged above the steering column 16, so as to extend on one side of the vertical mid-plane PM of the vehicle.

The device may be mounted on a right-hand-drive vehicle as well as on a left-hand-drive vehicle.

The expression principal cross-section will be used for any cross-section of the casing 12 in a plane substantially parallel to the principal surface of an evaporator 30 (defined below) housed in the casing.

Figure 2:
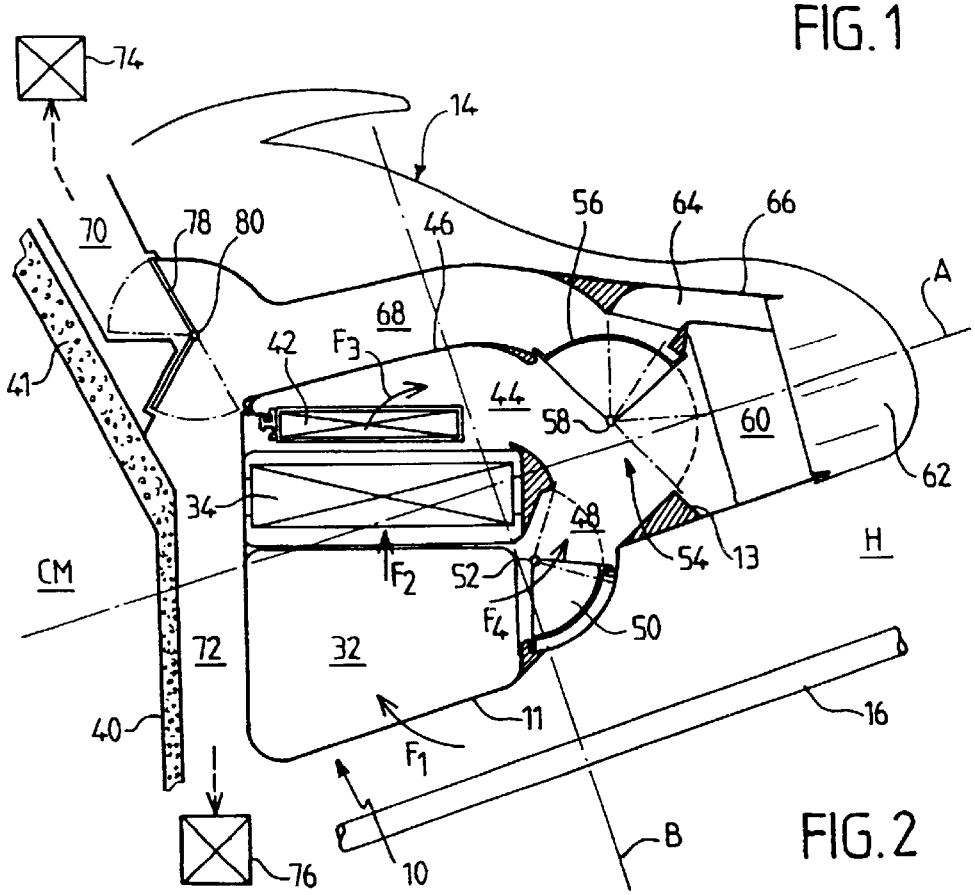
FIG. 2 is a sectional view, on an enlarged scale, along the line II—II of FIG. 1.

FIG. 2 represents a sectional view along one of the principal cross-sections of the casing. Seen in section along its principal cross-section, the casing 12 has the general shape of an elongate trapezium. In the plane defined by the principal cross-section of the casing, the expression "longitudinal axis A" will be used for the axis parallel to the steering column 16 and forming an angle of about 45 with the instrument panel 14. Moreover, the expression "transverse axis B" will be used for the axis perpendicular to the longitudinal axis A of the casing. According to the invention, the ratio between the dimension of the casing 12 along its longitudinal axis A (longitudinal dimension LD) and the dimension of the casing along its transverse axis B (transverse dimension TD) is substantially greater than or equal to 1.3. Preferably, this ratio is substantially equal to 1.6.

The device 10 comprises an air blower 18 housed in the casing 12 and arranged close to the left-hand side 20 of the vehicle. The blower 18 comprises a turbine 22 driven in rotation by an electric motor (not represented) and arranged within a volute-shaped housing 24. The blower is capable of being fed either with external air taken from outside the passenger compartment H of the vehicle or with recirculated air taken from inside this passenger compartment, or even with a mixture of the two. The turbine sucks in the air axially and delivers it radially so as to accelerate it tangentially.

The blower 18 has an outlet 26 through which the airflow F1 is delivered in a substantially horizontal direction.

The flow F1 passes successively through an air filter 28 and an evaporator 30 which are both arranged in substantially vertical parallel planes. The air filter 28 and the evaporator 30 have respective principal faces which are parallel to each other and substantially parallel to the mid-plane PM of the vehicle. The air filter 28 and the evaporator 30 are housed at the inlet to an angled channel 32, forming a deflector, which makes it possible to divert the airflow leaving the evaporator 30 substantially at right angles, so as to direct it vertically in the upwards direction as represented by the arrow F2.

At the outlet from the channel 32 a heating radiator 34 is provided, in a substantially horizontal position, situated close to the mid-plane PM of the vehicle. In other words, the radiator 34 possesses respective principal faces (entry face and exit face) which are substantially horizontal. The heating radiator 34 is a heat exchanger of the air/liquid type suitable for being traversed by a hot fluid, typically the liquid serving for cooling the engine of the vehicle. A throughput adjusting cock 36 is provided on pipework 38 linked to the radiator 34, so as to adjust the throughput of the hot fluid passing through the radiator, in order to furnish a temperature adjustment.

In the example, the flow F2 always at least partly passes through the radiator 34, which allows adjustment of the temperature of the airflow, according to the technique known as "adjustment on water". This makes it possible to produce a flow of air F3, at the outlet from the radiator 34, the temperature of which has been adjusted.

FIG. 2 also shows the respective positions of the channel 32 and of the radiator 34. As can be seen, the device 10 is arranged close to the bulkhead 40 which separates the engine compartment CM from the passenger compartment H of the vehicle.

The device 10 further comprises an electric booster radiator 42 (FIGS. 1 and 2) arranged downstream of the heating radiator 34, so that the airflow passes successively through the heating radiator and the electric booster radiator. The booster radiator 42 is located above the heating radiator 34 and in a substantially horizontal position. The booster radiator 42 advantageously comprises electrical resistance elements (not represented) of the positive-temperature-coefficient type (called PTC heating resistance elements).

The airflow F3 is collected in an outlet chamber 44 which communicates with the exit from the radiator and with air-distribution means which will be described now by reference to FIG. 2. The outlet chamber 44 extends at least partly above the booster radiator 42 and is bounded at its upper part by a partition 46 forming a deflector.

As shown in FIG. 1, the evaporator 30 exhibits a principal surface extending in a first principal plane (X) and the heating radiator 34 exhibits a principal surface extending in a second principal plane (Y).

The evaporator 30 is traversed by the airflow F1 along a first direction substantially perpendicular to the first principal plane (X), and this airflow is then diverted by the deflector-forming angled channel 32. The airflow is thus oriented along a second direction (airflow F2) substantially parallel to the second principal plane Y.

At least a part of the airflow passes through the heating radiator 34, and is then diverted by the deflector-forming partition 46 so as to be oriented in a direction substantially parallel to the second principal plane Y.

The device further comprises a take-off duct 48 (FIG. 2) which, communicates, one side, with the angled channel 32 and, on the other side, with the outlet chamber 44 under the control of an adjusting flap 50. The adjusting flap comprises a drum-type flap mounted pivoting about a horizontal spindle 52. This flap can be displaced between two extreme positions: an opening position (represented in solid line) and a closing position (represented in broken line) in which the take-off duct is respectively open and closed.

When the duct is open, the outlet chamber 44 is fed both with the airflow F3 originating from the heating radiator and with a flow of air F4 originating directly from the channel 32, and hence from the evaporator. In contrast, when the flap 50 is closed, the outlet chamber 44 is fed only with air originating from the radiator 34.

Hence, in both cases, the outlet chamber 44 is fed at least in part with a flow of air originating from the radiator 34. The flap 50 is smaller in size as compared with a conventional mixing flap used in the case in which the temperature adjustment takes place by mixing a cold and hot airflow, in the technique known as "adjustment on air".

The air-distribution means of the device 10 comprise at least one ventilation duct 60 which is integrated into the instrument panel and which advantageously extends between the right-hand and left-hand sides of the passenger compartment. This ventilation duct 60 forms a connection between the outlet chamber 44 and at least one ventilation nozzle 62 provided in the central part of the instrument panel and, if appropriate, with lateral ventilation nozzles (not visible on the drawing) provided on the two sides of the instrument panel.

Moreover, the distribution means comprise a lateral de-icing duct 64 which is bounded at least partly by a hollow beam 66 serving as reinforcement for the instrument panel. The duct 64 forms the connection between the outlet chamber and lateral de-icing nozzles (not represented) making it possible to de-ice/de-mist side windows of the vehicle.

Furthermore, the distribution means comprise a connecting duct 68 which extends above the partition 46 and which forms a connection between the outlet chamber 44 and two ducts 70 and 72. Duct 70 is an upper de-icing duct which feeds nozzles 74 (represented diagrammatically) serving for de-icing/de-misting the windscreen. Duct 72 is a lower ventilation duct which feeds at least one ventilation nozzle 76 (represented diagrammatically) which opens low down in the passenger compartment, in the region of the feet of the occupants of the vehicle.

A distribution flap 56 is arranged at one end 54 of the outlet chamber 44 (FIG. 2). The distribution flap 56 is of the drum type. That, depending on its position, shares the airflow originating from the outlet chamber 44 between various outlet nozzles which open into the passenger compartment, doing so on the basis of the air temperature regarded as comfortable by the passenger or passengers of the vehicle.

For example, when the distribution flap 56 is against a first stop at one end of the partition 46, the whole of the airflow coming from the outlet chamber 44 is discharged into the central ventilation duct 60.

When the distribution flap 56 is against a second stop at rest 13 of a lower wall 11 of the casing 12, the airflow originating from the outlet chamber 44 is sent into the passenger compartment through the lateral de-icing nozzles, the nozzles for de-icing the windscreen 74 and the feet ventilation nozzles 76.

Advantageously, an intermediate position of the distribution flap 56 makes it possible to de-ice the windscreen without sending any air to the side windows of the vehicle. On conventional air conditioning apparatus, it is not generally possible to de-couple the central de-icing control from the lateral de-icing control.

As can be seen in FIG. 2, the ducts 70 and 72 are directed substantially vertically and both extend along the bulkhead 40.

One of the walls of the ducts 70 and 72 includes a soundproofing cladding 41 which is generally bonded to the bulkhead 40 separating the engine compartment from the passenger compartment. This arrangement of the ducts 70 and 72 along the soundproofing cladding 41 advantageously reduces the noise originating from the propagation of the air in a duct.

A butterfly-type adjusting flap 78, comprising two non-coplanar wings, is pivotably mounted about a spindle 80 so as to allow direction of the treated airflow originating from the connecting duct 68 to the upper de-icing duct 70 and/or the lower ventilation duct 72. The flap 78 is situated at the intersection of the connecting duct 68 and of the ducts 70 and 72.

Hence, depending on the respective positions of the flaps 56 and 78, it is possible to send the treated airflow to the desired nozzles.

Figure 3:
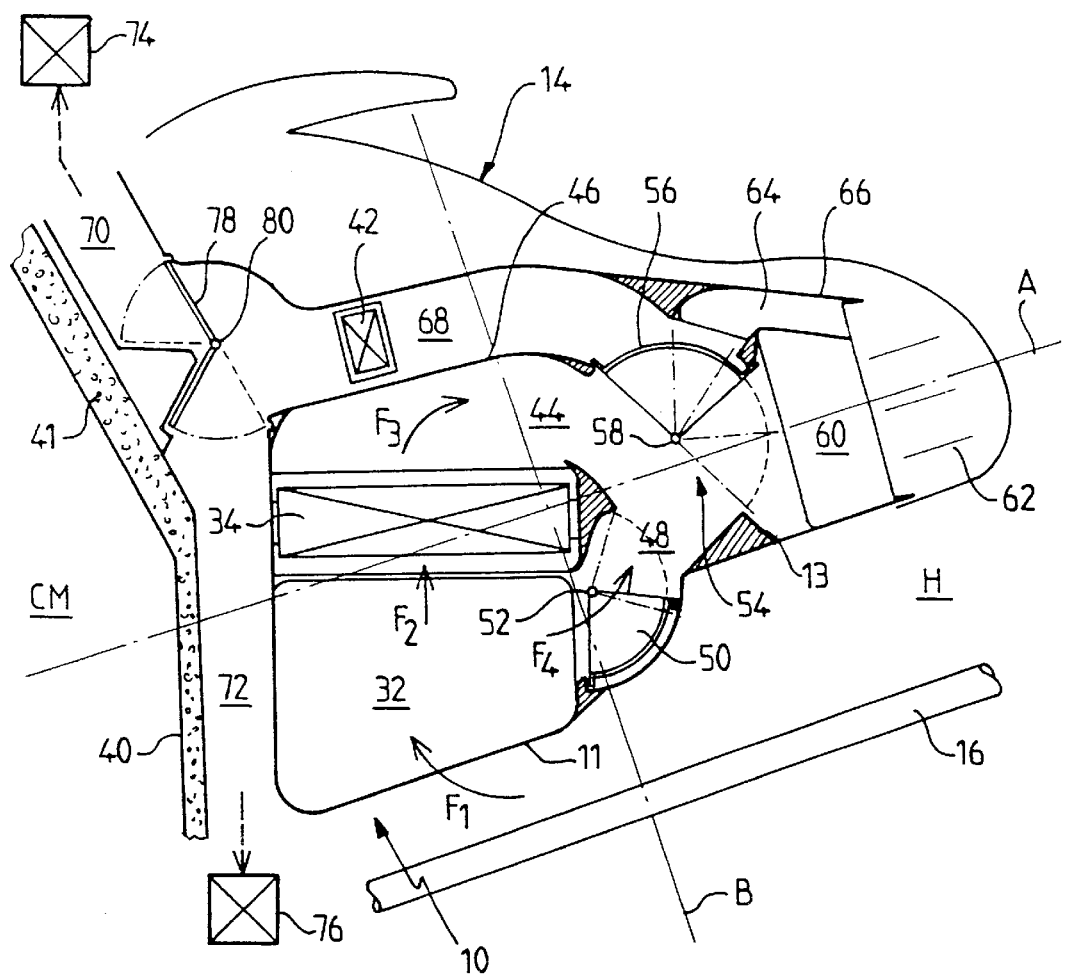
FIG. 3 is a sectional view similar to FIG. 2 in a second embodiment of the invention.

According to a second embodiment, represented in FIG. 3, the electric booster radiator 42 is not arranged parallel to the heating radiator 34, but is fixed onto the wall 46 outside the casing 12, in the region of the connecting duct 68. Advantageously, the user may control the heating radiator 34 and the booster radiator 42 independently.

The device of the invention is suitable for being used in various drive types of vehicles, that is to say right-hand-drive vehicles or left-hand-drive vehicles, in which it can easily be installed in the instrument panel.

What is claimed is:

1. A heating/air-conditioning device suitable for being housed in an instrument panel of a passenger compartment of a vehicle, the device comprising an evaporator;

a heating radiator;

an air-distribution means for distributing air including a first deflector means for deflecting air and a second deflector means for deflecting; and a blower for sending airflow through the evaporator and through the heating radiator to be diffused by the air-distribution means into the passenger compartment of the vehicle, wherein a principal surface of the evaporator extends in a first principal plane and a principal surface of the heating radiator extends in a second principal plane, the evaporator traversed by the airflow in a first direction substantially perpendicular to the first principal plane, the first deflector means operative to divert the airflow so as to orient the airflow in a second direction substantially perpendicular to the second principal plane wherein at least a part of the airflow passes through the heating radiator, the second deflector means operative to thereafter divert the airflow to orient the airflow in a direction substantially parallel to the second principal plane, wherein the blower, the evaporator, the heating radiator and at least a part of the distribution means are included in a substantially rectangular-shaped casing.

2. The device of claim 1, the air-distribution means further comprising:

a distribution flap, and an outlet chamber, wherein the heating radiator communicates the airflow that passes therethrough to the outlet chamber, the outlet chamber communicating directly with the distribution flap.

3. The device of claim 2, the air-distribution means further comprising:

an adjusting flap; and a take-off duct which communicates, on one side, with the first deflector means and, on the other side, under the control of the adjusting flap, with the outlet chamber, such that the outlet chamber may be selectively fed with a flow of air originating from the heating radiator and a flow of air originating from the evaporator.

4. The device of claim 2, wherein the air-distribution means further comprise at least one ventilation nozzle in communication with the instrument panel; and at least one ventilation duct which forms a connection between the outlet chamber and the at least one ventilation nozzle.

5. The device of claim 2, wherein the air-distribution means further comprise at least one de-icing nozzle; and at least one de-icing duct which forms a connection between the outlet chamber and the at least one de-icing nozzle.

6. The device of claim 5, wherein the air-distribution means further comprise a connecting duct; and an upper de-icing duct which communicates with the outlet chamber via the connecting duct and which communicates with the at least one de-icing nozzle for de-icing/de-misting a windscreen of the vehicle.

7. The device of claim 6, wherein the connecting duct further comprises an electric booster radiator for heating the airflow discharged therethrough.

8. The device of claim 7, which includes independent heating controls for setting the heating radiator and the electric booster radiator.

9. The device of claim 6, the air-distribution means further including a lateral de-icing duct which is delimited at least in part by a hollow beam that serves as reinforcement for the instrument panel, wherein an intermediate position of the distribution flap is provided, wherein in the intermediate position, the outlet chamber communicates with the upper de-icing duct via the connecting duct and the lateral de-icing duct is obstructed.

10. The device of claim 2, wherein the air-distribution means further comprise at least one lateral de-icing nozzle; and a lateral de-icing duct which is delimited at least in part by a hollow beam that serves as reinforcement for the instrument panel, the lateral de-icing duct forming a connection between the outlet chamber and the lateral de-icing nozzle.

11. The device of claim 2, wherein the air-distribution means further comprise at least one ventilation nozzle in communication with a region of the passenger compartment proximate a vehicle passenger's feet; and a lower ventilation duct which forms a connection between the outlet chamber and the at least one ventilation nozzle.

12. The device of claim 11, the air-distribution means further comprising an upper de-icing duct; and a connecting duct, said connecting duct serving to connect the upper de-icing duct to the outlet chamber, wherein the lower ventilation duct also communicates with the outlet chamber via the connecting duct.

13. The device of claim 12, the air-distribution means further comprising an adjusting flap at an intersection of the connecting duct, the upper de-icing duct and the lower ventilation duct, the adjusting flap operative to selectively direct the airflow to the upper de-icing duct and/or the lower ventilation duct.

14. The device of claim 12, wherein the upper de-icing duct and the lower ventilation duct both extend along a bulkhead which separates an engine compartment of the vehicle from the passenger compartment of the vehicle.

15. The device of claim 12, wherein the connecting duct further comprises an electric booster radiator for heating the airflow discharged through the upper de-icing duct and/or through the lower ventilation duct.

16. The device of claim 15, which includes independent heating controls for setting the heating radiator and the electric booster radiator.

17. The device of claim 11, the air-distribution means further comprising an upper de-icing duct, wherein a wall of the lower ventilation duct and/or a wall of the upper de-icing duct includes soundproofing cladding for a bulkhead which separates an engine compartment of the vehicle from the passenger compartment of the vehicle.

18. The device of claim 17, wherein the wall of the lower ventilation duct and the wall of the upper de-icing duct are a single wall including the soundproofing cladding of the bulkhead.

19. The device of claim 1, wherein the heating radiator is a liquid/air heat exchanger suitable for being traversed by a hot fluid and is fitted with a cock for adjusting throughput of the hot fluid.

20. The device of claim 1 wherein the first deflector means comprise an angled channel.

21. The device of claim 1, wherein the second deflector means comprise a partition of a casing of the device.

22. The device of claim 1 further comprising:
    an electric booster radiator arranged downstream of the heating radiator such that a portion of the at least a part of the airflow passes successively through the heating radiator and the electric booster radiator.

23. The device of claim 1, wherein the casing is shaped to be placed on the same side as a driving position of the vehicle and above a steering column of the vehicle.

24. The device of claim 1, wherein, in a principal cross-section, the casing has a trapezoidal shape elongate along a longitudinal axis substantially parallel to a steering column of the vehicle, and wherein the ratio of the dimension of the casing along the longitudinal axis and the dimension of the casing along an axis perpendicular to the longitudinal axis exceeds about 1.3.

25. The device of claim 24, wherein the ratio of the dimension of the casing along the longitudinal axis and the dimension of the casing along the axis perpendicular to the longitudinal axis is substantially equal to 1.6.

26. A heating/air-conditioning device for providing an airflow to a passenger compartment of a vehicle and suitable to be housed in an instrument panel of the vehicle, the device comprising:
    a blower for generating the airflow;
    an evaporator having a principal surface extending in a first principal plane;
    a heating radiator having a principal surface extending in a second principal plane; and
    an air-distribution system including a first deflector, a second deflector, an adjusting flap, an outlet chamber, and a third deflector, the first deflector operative to direct the airflow from the blower into a first direction substantially perpendicular to the first principal plane and thereupon through the evaporator, the second deflector operative to then orient the airflow in a second direction substantially perpendicular to the second principal plane, the adjusting flap operative to thereupon selectively directing the airflow through and/or around the heating radiator and into the outlet chamber, the third deflector operative to orient a first portion of the airflow in the outlet chamber in a direction substantially parallel to the second principal plane, the outlet chamber in communication with the passenger compartment, wherein the blower, the evaporator, the heating radiator and at least a part of the distribution means are included in a substantially rectangular-shaped casing.

27. The device of claim 26 wherein the air-distribution system further comprises
    a distribution flap, the distribution flap operative to selectively enable communication of the airflow from the outlet chamber directly and/or indirectly with the passenger compartment.

28. The device of claim 27 wherein the air-distribution system further comprises
    at least two nozzles providing direct communication to the passenger compartment;
    at least one duct connecting the outlet chamber and at least one of the nozzles.

29. The of claim 28 wherein each of the nozzles is one of a ventilation nozzle or a de-icing/de-misting nozzle.

30. The device of claim 27 having two ducts in communication with the outlet chamber, wherein the air-distribution system further comprises
    a second adjusting flap positioned at the intersection of the two ducts to selectively direct the airflow to each of the ducts.

31. The device of claim 30 wherein each of the ducts includes a soundproofing cladding.

32. The device of claim 26 wherein the first deflector and the second deflector are angled channels and the third deflector is a partition of a casing of the device.

33. The device of claim 26 further comprising
    an electric booster radiator arranged such that a second portion of the airflow passes successively through the heating radiator and the electric booster radiator.

34. The device of claim 26 wherein a principal cross-section of the casing has a trapezoidal shape elongate along a longitudinal axis substantially parallel to the steering column of the vehicle, and wherein the ratio of the casing dimension along the longitudinal axis to the casing dimension along an axis perpendicular to the longitudinal axis exceeds about 1.3.

* * * * *